United States Patent
Wong

(10) Patent No.: US 12,224,798 B2
(45) Date of Patent: Feb. 11, 2025

(54) METHOD AND TEST SYSTEM FOR TESTING LIGHT-FIDELITY COVERAGE

(71) Applicant: Rohde & Schwarz GmbH & Co. KG, Munich (DE)

(72) Inventor: Kok Meng Wong, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 178 days.

(21) Appl. No.: 18/058,995

(22) Filed: Nov. 28, 2022

(65) Prior Publication Data
US 2024/0178917 A1    May 30, 2024

(51) Int. Cl.
*H04B 10/116*    (2013.01)
*H04B 17/318*    (2015.01)

(52) U.S. Cl.
CPC ......... *H04B 10/116* (2013.01); *H04B 17/318* (2015.01)

(58) Field of Classification Search
None
See application file for complete search history.

(56) References Cited

U.S. PATENT DOCUMENTS

| | | | | |
|---|---|---|---|---|
| 8,180,225 | B2 * | 5/2012 | Werthen | G06F 13/385 398/171 |
| 10,461,860 | B2 * | 10/2019 | Miras | H04B 10/116 |
| 11,689,284 | B2 * | 6/2023 | Seyvet | H04B 10/116 398/118 |
| 11,949,452 | B2 * | 4/2024 | Germe | H04B 17/30 |
| 2021/0165031 | A1 | 6/2021 | Araojo et al. | |
| 2023/0353240 | A1 * | 11/2023 | Calvente | H04B 10/116 |
| 2024/0072893 | A1 * | 2/2024 | Van Wageningen | H04B 10/116 |

FOREIGN PATENT DOCUMENTS

WO    2021/209352 A1    10/2021

OTHER PUBLICATIONS

Sackinger, Eduard, Lecture Notes on: Broadband Circuits for Optical Fiber Communication, 2002 (Year: 2002).*

* cited by examiner

*Primary Examiner* — Jai M Lee
(74) *Attorney, Agent, or Firm* — CHRISTENSEN O'CONNOR JOHNSON KINDNESS PLLC

(57) ABSTRACT

The present disclosure relates to a method of testing light-fidelity (LiFi) coverage. A mobile light-fidelity tester is moved in a test area in which at least one indoor light-fidelity access point is located while performing coverage tests of the at least one indoor light-fidelity access point. Further, a coverage report of the at least one indoor light-fidelity access point is returned. In addition, a test system is described.

17 Claims, 1 Drawing Sheet

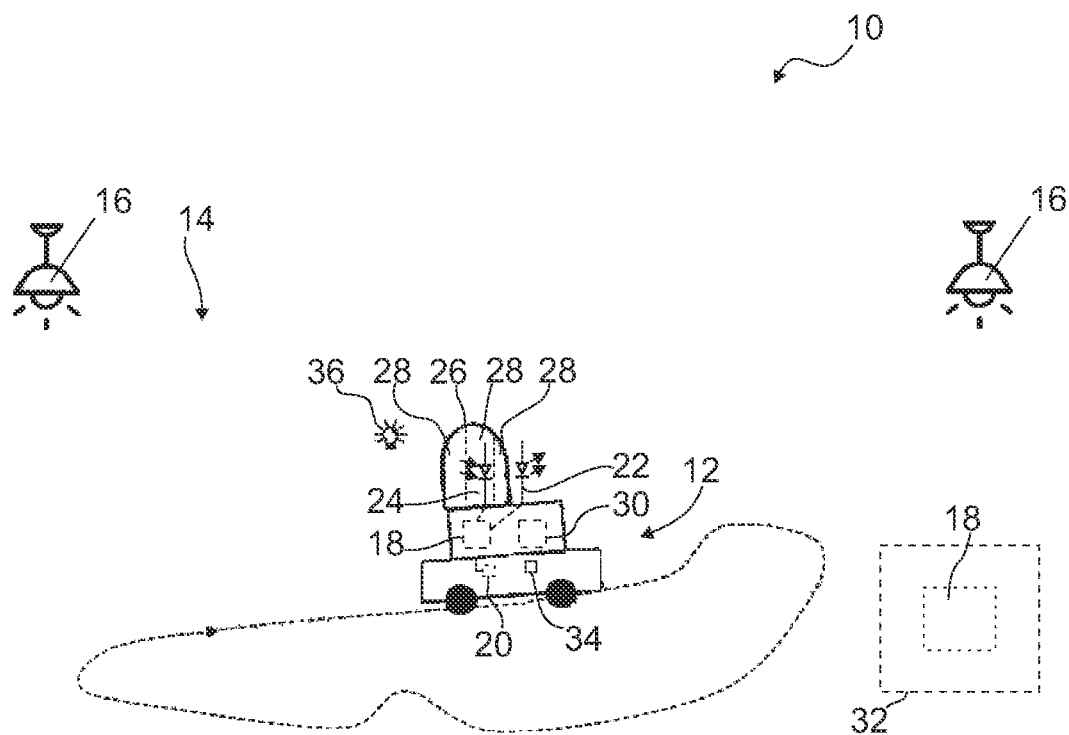

Fig. 1

Moving a mobile light-fidelity tester in a test area in which at least one indoor light-fidelity access point is located while performing coverage tests of the at least one indoor light-fidelity access point Analyzing the light signals received by means of the light-fidelity tester and/or the at least one indoor light-fidelity access point, thereby obtaining analysis results Generating a coverage report based on the analysis results Returning the coverage report of the at least one indoor light-fidelity access point

Fig. 2

METHOD AND TEST SYSTEM FOR TESTING LIGHT-FIDELITY COVERAGE

FIELD OF THE DISCLOSURE

Embodiments of the present disclosure relate to a method of testing light-fidelity (LiFi) coverage. Further, embodiments of the present disclosure relate to a test system for testing light-fidelity (LiFi) coverage.

BACKGROUND

Light fidelity ("LiFi", also written as "Li-Fi") is a wireless communication technology that uses light to transmit data between communication devices.

Accordingly, LiFi is a light communication technology that is capable of transmitting data at high speeds over visible light, ultraviolet, and infrared spectrums. Typically, light-emitting dials (LEDs) can be used for the transmission. In fact, LiFi is based on a modulation of light intensity to transmit the data in a wireless manner between the respective communication devices. Generally, LiFi is a potential candidate for 6G in order to cope with the ever increasing wireless data traffic.

Since light is used for transmitting the data, the respective data transmission (communication) may be affected by interferences, for instance ambient light like sunlight or obstacles located within a line-of-sight between the devices that communicate with each other.

Due to these restrictions, LiFi is typically used in indoor applications, for instance industry facilities. For establishing the respective communication, at least one indoor light-fidelity access point is necessary that communicates with mobile light-fidelity devices. In other words, a LiFi network is deployed by the at least one indoor light-fidelity access point. Accordingly, a customer/user of the LiFi network needs to know the coverage of the at least one indoor light-fidelity access point in order to characterize the LiFi network.

However, the coverage of the indoor light-fidelity access point cannot be determined theoretically, as ambient light and other effects may have an influence on the coverage.

Accordingly, there is a need for a method as well as a test system for testing light-fidelity coverage in an efficient manner.

SUMMARY

Embodiments of the present disclosure provide a method of testing light-fidelity (LiFi) coverage. In an embodiment, the method comprises the steps of:
  Moving a mobile light-fidelity tester in a test area in which at least one indoor light-fidelity access point is located while performing coverage tests of the at least one indoor light-fidelity access point, and
  Returning a coverage report of the at least one indoor light-fidelity access point.

In addition, embodiments of the present disclosure provide a test system for testing light-fidelity (LiFi) coverage. In an embodiment, the test system comprises a mobile light-fidelity tester capable of moving in a test area in which at least one indoor light-fidelity access point is located while performing coverage tests of the at least one indoor light-fidelity access point. The test system comprises at least one processing circuit that is capable of analyzing test results obtained from the coverage tests in order to generate a coverage report of the at least one indoor light-fidelity access point.

The main idea is to provide the light-fidelity tester that is enabled to move within the test area in order to perform the coverage tests of the at least one indoor light-fidelity access point, thereby gathering information concerning the coverage of the at least one indoor light-fidelity access point. While moving within the test area, the light-fidelity tester is enabled to perform the respective coverage tests in order to gather information, namely test results, at different locations within the test area.

An aspect provides that the mobile light-fidelity tester, for example, receives light signals transmitted from the at least one indoor light-fidelity access point while moving in the test area and/or wherein the mobile light-fidelity tester transmits light signals to be received by the at least one indoor light-fidelity access point while the mobile light-fidelity tester is moving in the test area. Therefore, the coverage can be tested with regard to the transmission properties and/or the receiving properties of the at least one indoor light-fidelity access point. In other words, the test system is generally enabled to perform transmission coverage tests as well as receiving coverage tests.

In some embodiments, the mobile light-fidelity tester comprises a transmitting photo diode and a receiving photo diode. The transmitting photo diode is used to transmit light signals that are received by the at least one indoor light-fidelity access point, thereby testing the receiving properties of the at least one indoor light-fidelity access point with respect to its coverage. Further, the receiving photo diode is used to receive light signals transmitted from the at least one indoor light-fidelity access point in order to determine the coverage of the at least one indoor light-fidelity access point with regard to its transmission properties.

Accordingly, the mobile light-fidelity tester can act as a transmitter as well as a receiver. As a transmitter, the mobile light-fidelity tester will send data in the form of light, for instance infrared (IR) light, to the at least one light-fidelity access point. As a receiver, the mobile light-fidelity tester will receive the light, for instance visible light, from the at least one light-fidelity access point and decode the light back to digital data.

In some embodiments, the transmitting photo diode may be an infrared LED, for example.

Accordingly, the mobile light-fidelity tester is capable of communicating with a light communication system, namely the at least one light-fidelity access point, which uses visible light to send data to a communication device and infrared (IR) light to receive data from the communication device.

Another aspect provides that the light signals received, namely the ones received by the light-fidelity tester and/or the ones received by the at least one indoor light-fidelity access point, for example, are analyzed, thereby obtaining analysis results based on which the coverage report is generated. In some embodiments, the light signals may be received by the respective entity, e.g. the mobile light-fidelity tester or the at least one indoor light-fidelity access point, thereby generating measurement results or rather test results. These measurement results or rather test results may be further processed by an analyzing engine executed on the processing circuit in order to analyze the measurement results or rather test results appropriately. Put differently, the analysis of the signals received is done by the analysis engine, namely the processing circuit. Accordingly, the processing circuit of the test system is capable of processing the measurement/test results derived from the received light signals in order to determine the analysis results based on which the coverage report is generated.

For instance, a transmission coverage report for the at least one indoor light-fidelity access point and/or a receiving coverage report for the at least one indoor light-fidelity access point may be generated, thereby distinguishing between the transmission properties and the receiving properties.

According to an embodiment, the receiving photo diode is surrounded by a dome, wherein an opacity property of the dome is controllable, thereby enabling a modification of the opacity property of the dome. In some embodiments, the dome has several sections wherein their opacity properties can be controlled, thereby ensuring an individual modification of the sections. Accordingly, receiving characteristics of the mobile light-fidelity tester can be adapted. The individual modification ensures that the coverage can be tested in a detailed manner, as specific orientations can be actively neglected by adapting the opacity properties of certain sections. For instance, only one section or two sections are controlled to be electrically transparent, whereas the other sections are controlled to be opaque, thereby limiting the receiving range of the receiving light diode, also called "viewing range".

For instance, the dome is made of an electrically switchable glass. The opacity property of the dome may be adapted in an electrical manner, for example during the movement of the mobile light-fidelity tester, while performing the coverage tests. In some embodiments, the transmission properties of the electrically switchable glass can be adapted by a control signal. Hence, it is not necessary to replace the dome mechanically for adapting the characteristics, which would result in an interruption of the testing. In some embodiments, the electrically switchable glass is a glass the opacity of which can be altered by applying a voltage.

In some embodiments, the electrically switchable glass can be used to simulate the presence of an object between the at least one light-fidelity access point and the mobile light-fidelity tester. The electrically switchable glass can also be used to simulate environmental conditions at which the visible light needs to be dimmed, e.g. at night.

According to an embodiment, the dome has an octagon shape. Hence, the dome may comprise eight different sections that can be controlled individually with regard to their opacity properties. For instance, only one of the sections is controlled to be electromagnetically transparent whereas the other seven sections are controlled to be opaque. Thus, a very specific orientation and/or direction can be tested in order to obtain a detailed coverage report. Moreover, an obstacle can be simulated accordingly.

Hence, the electrically switchable glass may comprise, for example, a panel of glasses. Each glass piece can be independently controlled.

When generating the coverage reports, the respective opacity properties controlled may be taken into account. Accordingly, different test/measurement results obtained under different conditions, for example different opacity properties, may be analyzed appropriately.

For instance, the coverage report may include data throughput measurements versus opacity property.

Generally, the mobile light-fidelity tester may comprise the processing circuit such that the mobile light-fidelity tester itself is capable of generating the coverage report while analyzing the measurement/test results obtained based on which the coverage report is generated.

The mobile light-fidelity tester may be connected with the at least one indoor light-fidelity access point in a signal transmitting manner, namely in addition to the light communication link. For instance, a communication link based on a wireless data communication like Wi-Fi is established in order to exchange the test/measurement results gathered by the at least one indoor light-fidelity access point when receiving the light signals transmitted from the mobile light-fidelity tester.

Alternatively, the mobile light-fidelity tester has a communication interface via which the mobile light-fidelity tester is connected to an analysis device that comprises the processing circuit. Thus, a separately formed analysis device may be provided that is used for analyzing the test/measurement results obtained. The separately formed analysis device may be connected with the mobile light-fidelity tester, for example in a wireless manner. Additionally, the analysis device may be connected with the at least one indoor light-fidelity access point in order to receive the test/measurement results from the at least one indoor light-fidelity access point, namely concerning light signals received by the at least one indoor light-fidelity access point.

Furthermore, a position of the mobile light-fidelity tester may be recorded while performing the coverage tests. Hence, the mobile light-fidelity tester may have a positioning sensor that is capable of providing position information of the mobile light-fidelity tester while moving in the test area. This ensures that the exact location of the mobile light-fidelity tester within the test area can be determined when performing the coverage test. Thus, a data fusion of the test/measurement results and the respective location is possible, thereby ensuring that the coverage report comprises detailed information. For instance, the coverage report may comprise a heatmap that illustrates the coverage of the at least one indoor light-fidelity access point.

Another aspect provides that a movement of the mobile light-fidelity tester is, for example, actively controlled. For instance, the processing circuit is capable of actively controlling a movement of the mobile light-fidelity tester. This ensures that the mobile light-fidelity tester reaches all locations within the test area, thereby ensuring a complete coverage test. Moreover, the processing circuit may control the mobile light-fidelity tester to move to a certain location within the test area in order to ensure that the coverage tests are performed at certain locations. The respective controlling may be based on the test/measurement results and/or the analysis results.

For instance, the processing circuit may detect that test/measurement results obtained at a certain location deviate from test/measurement results obtained at neighbored locations. Thus, the processing circuit may actively control the mobile light-fidelity tester to move to the respective location again in order to verify whether a measurement failure occurred or an issue of the at least one indoor light-fidelity access point occurs.

In addition, an interference may be emulated while performing the coverage tests of the at least one indoor light-fidelity access point. The interference may be generated by switching on a certain light source that provides an interference. Alternatively, the interference may be generated on the measurement results obtained by adapting the measurement results in order to emulate an interference.

Generally, the interference is emulated since LiFi communication is sensitive to ambient light, e.g. sunlight, lamps, TV/monitor screens, fire, and so on. The stronger is the ambient light, the more negative impact it will have to the test/measurement results, e.g. data throughput. The purpose of the light interference emulation is to simulate the presence of ambient light. In case of a real light source used for emulating the interference, the light source will be placed at a known distance to mobile light-fidelity tester, for example its receiving photo diode. The intensity of the light source can be changed on-the-fly, namely while moving within the test area.

Further, the coverage tests performed comprise measurements of Block Error Rate, signal strength, intensity, a Received Signal Strength Indicator, a modulation scheme, an Error Vector Magnitude and/or data throughput. All of these different measurements contribute to determining the coverage of the at least one indoor light-fidelity access point.

The test system may comprise several indoor light-fidelity access points that are located in the test area. The several indoor light-fidelity access points together establish an area of interest, the coverage of which shall be determined.

In general, the mobile light-fidelity tester may comprise an unmanned vehicle that can be moved autonomously within the test area based on control signals received, e.g. from the processing circuit. For instance, the unmanned vehicle is an unmanned aerial vehicle like a drone.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 schematically shows an overview of a test system according to an embodiment of the present disclosure, and FIG. 2 schematically shows an overview of a method of testing light-fidelity coverage according to an embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Therein and in the following, the terms "circuit" in some embodiments is understood to describe suitable hardware, suitable software, or a combination of hardware and software that is configured to have a certain functionality. The hardware may, inter alia, comprise a CPU, a GPU, an FPGA, an ASIC, or other types of electronic circuitry.

In FIG. 1, an example embodiment of a test system 10 is shown that is used for testing light-fidelity (LiFi) coverage. The test system 10 comprises a mobile light-fidelity tester 12 that is capable of moving in a test area 14 in which at least one indoor light-fidelity access point 16 is located while performing coverage tests of the at least one light-fidelity access point 16. In the shown embodiment, two indoor light-fidelity access points 16 are provided that are associated with the test area 14.

The mobile light-fidelity tester 12 relates to, for example, an unmanned vehicle that can move within the test area 14 autonomously. For instance, the mobile light-fidelity tester 12 is an unmanned aerial vehicle (UAV) like a drone, a robot or a vehicle driving on a floor of the test area 14.

In the shown embodiment, the mobile light-fidelity tester 12 comprises a processing circuit 18 that is connected with an engine 20 that is used to move mobile light-fidelity tester 12 based on control signals obtained from the processing circuit 18.

In addition, the processing circuit 18 is also connected with a transmitting photo diode 22 and a receiving photo diode 24 which are used for performing the coverage tests. In some embodiments, the processing circuit 18 is enabled to control signal transmission via the transmitting photo diode 22, for instance transmission of infrared light. Thus, the transmitting photo diode 22 may relate to an infrared light emitting diode (LED).

The respective signals transmitted by the light-fidelity tester 12 are received by the at least one indoor light-fidelity access point 16, thereby obtaining test/measurement results that may contribute to a receiving coverage of the at least one indoor light-fidelity access point 16.

In addition, the processing circuit 18 is also enabled to analyze light signals received by the receiving photo diode 24. The receiving photo diode 24 receives light signals transmitted by the at least one indoor light-fidelity access point 16, wherein the respective test/measurement results may contribute to a transmission coverage of the at least one indoor light-fidelity access point 16.

As shown in FIG. 1, the receiving photo diode 24 is surrounded by a dome 26 that has several sections 28. For instance, the dome 26 has an octagon shape such that eight different sections 28 may be provided.

In general, the opacity property of the dome 26 may be controlled in an electrical manner, thereby modifying the opacity property such that the dome 26 may become more opaque depending on the control signal. In some embodiments, the sections 28 may be individually controlled such that an individual modification of the opacity properties of each of the several sections 28 of the dome 26 may take place. Accordingly, all but one section 28 may be controlled to be electromagnetically opaque for visible light, whereas one section 28 remains electromagnetically transparent for visible light.

For instance, the dome 26 or particularly its individual sections 28 may be made of an electrically switchable glass that is controlled by a voltage applied.

Since the opacity properties can be electrically modified, the respective opacity properties may be adapted during the testing without the need of mechanically exchanging the dome 26 itself. Hence, the properties may be adapted on-the-fly, namely while moving the mobile light-fidelity tester 12.

The mobile light-fidelity tester 12 has a communication interface 30 via which the mobile light-fidelity tester 12 is enabled to communicate with the at least one indoor light-fidelity access point 16. Hence, test/measurement results gathered by the at least one indoor light-fidelity access point 16 can be transmitted to the mobile light-fidelity tester 12 for further analysis, as the processing circuit 18 is integrated within the mobile light-fidelity tester 12 in the shown embodiment.

Generally, the processing circuit 18 receives the test/measurement results associated with the received light signals such that the coverage tests are performed with regard to the transmission properties as well as the receiving properties of the at least one indoor light-fidelity access point 16.

In an alternative embodiment, a separately formed analysis device 32 may be provided that comprises the processing circuit 18. Hence, the light-fidelity tester 12 may communicate with the separately formed analysis device 32 via the communication interface 30. The analysis device 32 may also communicate with the at least one indoor light-fidelity access point 16, for instance in a wireless manner or in a wired manner.

In any case, the processing circuit 18 is generally capable of processing the measurement results obtained in order to gather the analyzing test results based on which a coverage report is generated. The coverage report provides insights of the coverage of the at least one indoor light-fidelity access point 16 with regard to the test area 14.

Moreover, the processing circuit 18 is capable of actively controlling the mobile light-fidelity tester 12 to move to certain locations at which coverage tests shall be performed. This ensures that the entire test area 14 is covered by the mobile light-fidelity tester 12 when performing the coverage tests. Furthermore, potentially false measurements can be repeated prior to generating the coverage report.

For this purpose, the mobile light-fidelity tester 12 has a positioning sensor 34 that is capable of providing position information of the mobile light-fidelity tester 12 while moving in the test area 14. Hence, the test results gathered can be combined with position information of the mobile light fidelity tester 12, thereby ensuring that an allocation of the test results and the position of the mobile light-fidelity tester 12 in the test area 14 is obtained.

The test system 10 is generally capable of performing a method of testing the light-fidelity coverage, an example of which is described below with reference to FIG. 2.

In a first step S1, the mobile light-fidelity tester 12 is moved in the test area 14 in which the at least one indoor light-fidelity access point 16 is located while performing the coverage tests of the at least one indoor light-fidelity access point 16. The respective coverage tests may comprise measurements of Block Error Rate, signal strength, intensity, a Received Signal Strength Indicator (RSSI), a modulation scheme, an Error Vector Magnitude (EVM) and/or data throughput.

In a second step S2, the processing circuit 18 gathers the test/measurement results obtained from the light signals received, for instance the light signals received by the mobile light-fidelity tester 12 as well as the light signals received by the at least one indoor light-fidelity access point 16.

The processing circuit 18 may further take the position information of the mobile light-fidelity tester 12 into account that are encompassed in the test/measurement results due to the positioning sensor 34 that provides position information accordingly.

In any case, the processing circuit 18 analyzes the light signals received, for instance the test/measurement results, thereby obtaining analysis results that provide deeper insights, as the analysis results at least also take the position information into account.

In a third step S3, a coverage report is generated based on the analysis results obtained after analyzing the light signals received, namely the test/measurement results obtained by the respective receiving entity, e.g. the mobile light-fidelity tester 12 and/or the at least one indoor light-fidelity access point 16.

In a fourth step S4, the coverage report generated is returned in order to inform a user appropriately In a certain embodiment, the receiving characteristics of the mobile light-fidelity tester 12 may be adapted during the testing, namely during moving and performing the coverage tests. As discussed above, the receiving characteristics may be adapted by electrically controlling the opacity property of the dome 26 that surrounds the receiving photo diode 24.

In addition, an interference may be emulated while performing the coverage tests in order to verify the influence of an interference on the coverage. The interferences may be emulated by simply switching on a light interference source 36 located at a certain position. The light intensity of the light interference source 36 can be varied appropriately.

Alternatively, the test/measurement results obtained may be adapted in order to emulate the occurrence of an interference source in a mathematical manner.

In any case, the method and the test system 10 ensure that the light-fidelity (LiFi) coverage of the at least one indoor light-fidelity access point 16 can be tested and determined in an efficient manner.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples of the disclosure, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein. In these or other embodiments, the processing circuit may be specifically configured to perform one or more of the steps of the claimed subject matter.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of testing light-fidelity (LiFi) coverage, the method comprising the steps of:
   moving a mobile light-fidelity tester in a test area in which at least one indoor light-fidelity access point is located while performing coverage tests of the at least one indoor light-fidelity access point, wherein an interference is emulated while performing the coverage tests of the at least one indoor light-fidelity access point or wherein the coverage tests performed comprise measurements of Block Error Rate (BLER), signal strength, intensity, a Received Signal Strength Indicator (RSSI), a modulation scheme, an Error Vector Magnitude (EVM) and/or data throughput; and
   returning a coverage report of the at least one indoor light-fidelity access point.

2. The method according to claim 1, wherein the mobile light-fidelity tester receives light signals transmitted from the at least one indoor light-fidelity access point while moving in the test area and/or wherein the mobile light-fidelity tester transmits light signals to be received by the at least one indoor light-fidelity access point while the mobile light-fidelity tester is moving in the test area.

3. The method according to claim 1, wherein the light signals received by the light-fidelity tester and/or the at least one indoor light-fidelity access point are analyzed, thereby obtaining analysis results based on which the coverage report is generated.

4. The method according to claim 1, wherein receiving characteristics of the mobile light-fidelity tester are adapted during the testing.

5. The method according to claim 4, wherein the receiving characteristics of the mobile light-fidelity tester are adapted by modifying opacity properties of a dome covering a receiving photo diode of the mobile light-fidelity tester.

6. The method according to claim 1, wherein a position of the mobile light-fidelity tester is recoded while performing the coverage tests.

7. The method according to claim 1, wherein a movement of the mobile light-fidelity tester is actively controlled.

8. A test system for testing light-fidelity (LiFi) coverage, wherein the test system comprises a mobile light-fidelity tester capable of moving in a test area in which at least one indoor light-fidelity access point is located while performing coverage tests of the at least one indoor light-fidelity access point, and at least one processing circuit that is capable of analyzing test results obtained from the coverage tests in order to generate a coverage report of the at least one indoor light-fidelity access point, wherein the mobile light-fidelity tester comprises a receiving photo diode, and wherein the receiving photo diode is surrounded by a dome, and wherein an opacity property of the dome is controllable, thereby enabling a modification of the opacity property of the dome.

9. The test system according to claim 8, wherein the mobile light-fidelity tester comprises a transmitting photo diode.

10. The test system according to claim 8, wherein the dome is made of an electrically switchable glass.

11. The test system according to claim 8, wherein the dome has an octagon shape.

12. The test system according to claim 8, wherein the processing circuit is integrated within the mobile light-fidelity tester.

13. The test system according to claim 8, wherein the mobile light-fidelity tester has a communication interface via which the mobile light-fidelity tester is connected to an analysis device that comprises the processing circuit.

14. The test system according to claim 8, wherein the mobile light-fidelity tester has a positioning sensor that is capable of providing position information of the mobile light-fidelity tester while moving in the test area.

15. The test system according to claim 8, wherein the processing circuit is capable of actively controlling a movement of the mobile light-fidelity tester.

16. The test system according to claim 8, wherein the test system comprises several indoor light-fidelity access points that are located in the test area.

17. A test system for testing light-fidelity (LiFi) coverage, wherein the test system comprises a mobile light-fidelity tester capable of moving in a test area in which at least one indoor light-fidelity access point is located while performing coverage tests of the at least one indoor light-fidelity access point, and at least one processing circuit that is capable of analyzing test results obtained from the coverage tests in order to generate a coverage report of the at least one indoor light-fidelity access point, wherein the mobile light-fidelity tester is an unmanned vehicle that is configured to move autonomously within the test area based on control signals received.

* * * * *